United States Patent
Sugino et al.

(10) Patent No.: US 9,373,859 B2
(45) Date of Patent: Jun. 21, 2016

(54) FUEL CELL STACK

(71) Applicant: Nissan Motor Co., Ltd., Kanagawa (JP)

(72) Inventors: Manabu Sugino, Kanagawa (JP); Kazuhiro Kageyama, Kanagawa (JP); Mitsutaka Abe, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/647,345

(22) PCT Filed: Nov. 6, 2013

(86) PCT No.: PCT/JP2013/080017
§ 371 (c)(1),
(2) Date: May 26, 2015

(87) PCT Pub. No.: WO2014/087785
PCT Pub. Date: Jun. 12, 2014

(65) Prior Publication Data
US 2015/0325870 A1    Nov. 12, 2015

(30) Foreign Application Priority Data

Dec. 3, 2012 (JP) ................................ 2012-264243

(51) Int. Cl.
*H01M 8/02* (2006.01)
*H01M 8/04* (2006.01)
*H01M 8/24* (2006.01)
*H01M 8/10* (2016.01)

(52) U.S. Cl.
CPC ........ *H01M 8/04559* (2013.01); *H01M 8/0202* (2013.01); *H01M 8/0271* (2013.01); *H01M 8/249* (2013.01); *H01M 8/2465* (2013.01); *H01M 8/245* (2013.01); *H01M 2008/1095* (2013.01); *Y02E 60/50* (2013.01)

(58) Field of Classification Search
CPC ............ H01M 8/0202; H01M 8/0271; H01M 8/04559; H01M 8/245; H01M 8/2465; H01M 8/249; H01M 2008/1095; Y02E 60/50
See application file for complete search history.

(56) References Cited

U.S. PATENT DOCUMENTS

2003/0082433 A1    5/2003   Sano et al.
2005/0271926 A1    12/2005  Sugita et al.

FOREIGN PATENT DOCUMENTS

| CN | 1828986 A | 9/2006 |
|---|---|---|
| JP | 2002-352820 A | 12/2002 |
| JP | 2008-166138 A | 7/2008 |
| JP | 2009-037834 A | 2/2009 |
| JP | 2012-028119 A | 2/2012 |
| JP | 2012-059563 A | 3/2012 |
| JP | 2012-190634 A | 10/2012 |

OTHER PUBLICATIONS

International Preliminary Report on Patentability from PCT/JP2013/080017 issued on Mar. 18, 2014 (13 pages).
International Search Report issued in PCT/JP2013/080017 mailed on Dec. 24, 2013 (2 pages).
International Preliminary Report on Patentability from PCT/JP2013/080017 issued on Mar. 18, 2014 (10 pages).

*Primary Examiner* — Brittany Raymond
(74) *Attorney, Agent, or Firm* — Osha Liang LLP (57) ABSTRACT

A fuel cell stack has a stacked plurality of cell modules, each of the plurality of cell modules comprising a stacked plurality of single cells, each of the plurality of single cells comprising a membrane electrode assembly sandwiched between a pair of separators, a pair of end plates that sandwich the plurality of cell modules in the stacking direction, sealing plates to seal a reactant gas, disposed between the plurality of cell modules and between outermost cell modules and the end plates, and a voltage measuring terminal protruding to an outside of the cells, provided in at least one of the sealing plates.

7 Claims, 9 Drawing Sheets

FUEL CELL STACK

BACKGROUND

1. Technical Field

The present invention relates to a fuel cell stack that includes a cell module including a stacked plurality of single cells, in particular to an improvement of a fuel cell stack that has a voltage measuring function for each single cell or cell module.

2. Related Art

One of such fuel cell stacks as described above has been described in Patent Document 1. The fuel cell stack of Patent Document 1 includes a stacked plurality of cells (single cells), each including a membrane electrode assembly sandwiched between a pair of separators, wherein connector structures protruding to the outside for monitoring voltage are formed in the separators with the same polarity of each cell. In such a fuel cell stack, since the outermost cell at the end of the cell stack has the connector structure for monitoring voltage only on one side, the voltage thereof cannot be monitored.

Thus, the fuel cell stack includes an electrically conductive cover plate, which has the same shape as the separators, and which is disposed at the end of the cell stack, and a connector structure for monitoring voltage is provided in the cover plate. For the fuel cell stack, the voltage is monitored by using the connectors of the separators of adjacent cells. Further, for the cell at the end of the cell stack, the voltage is monitored by using the connector of the cover plate. Accordingly, the voltage can be monitored for all of the cells.

CITATION LIST

Patent Literature

Patent Document 1: Japanese Patent Unexamined Publication No. 2002-352820

SUMMARY OF INVENTION

However, such conventional fuel cell stacks as described above may require an additional sealing structure between the separator and the cover plate to seal a reactant gas, which causes problems of the increased number of parts and complex structure.

A fuel cell stack according to one or more embodiments of the present invention includes a cell module including a stacked plurality of single cells, in which the voltage at a desired portion can be measured without any additional sealing structure.

The fuel cell stack according to one or more embodiments of the present invention includes: a stacked plurality of cell modules, each of the plurality of cell modules including a stacked plurality of single cells, each of the plurality of single cells including a membrane electrode assembly sandwiched between a pair of separators; and a pair of end plates that sandwich the stacked plurality of cell modules in the stacking direction. The fuel cell stack further includes: sealing plates to seal a reactant gas, disposed between the cell modules and between the outermost cell modules and the end plates; and a voltage measuring terminal protruding to the outside provided in at least one of the sealing plates.

With one or more embodiments of the present invention, the fuel cell stack, which includes the cell modules, each including a stacked plurality of single cells, can seal the reactant gas by utilizing the sealing structure of the cell modules. This enables measuring the voltage at a desired portion without any additional particular sealing structure, which also contributes to cost reduction and the like.

BRIEF DESCRIPTION OF DRAWINGS

FIG. 8(A) is a front view.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
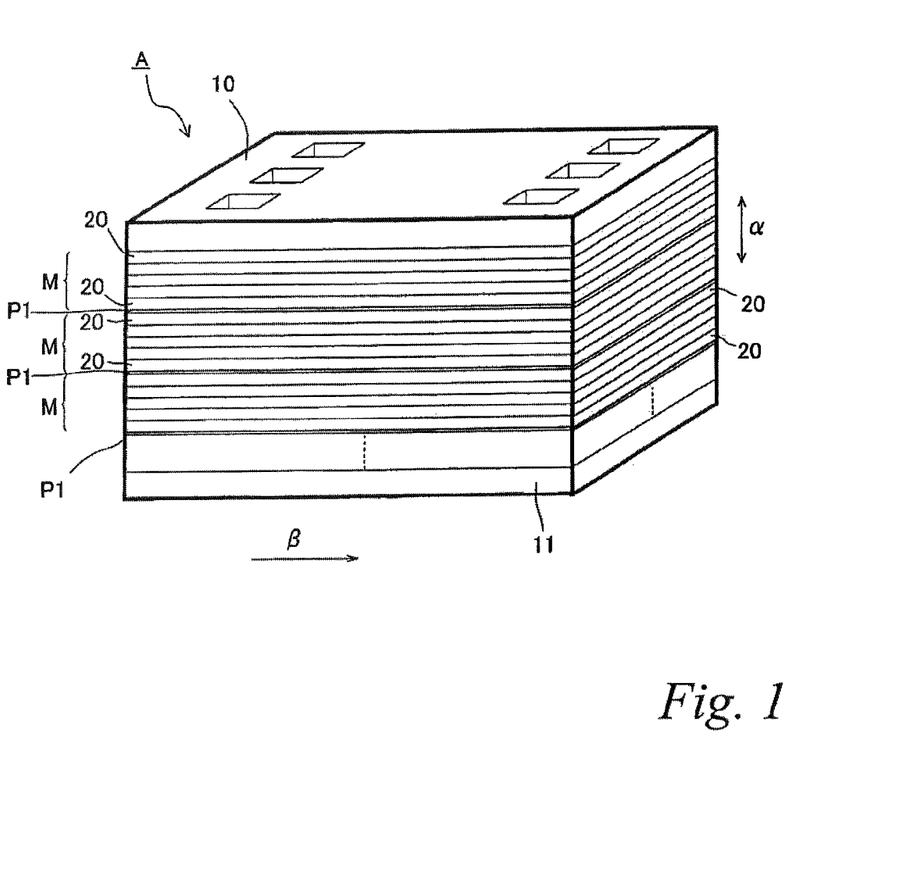
FIG. 1 is a schematic perspective outline view of a fuel cell stack according to one or more embodiments of the present invention.
Figure 2A:
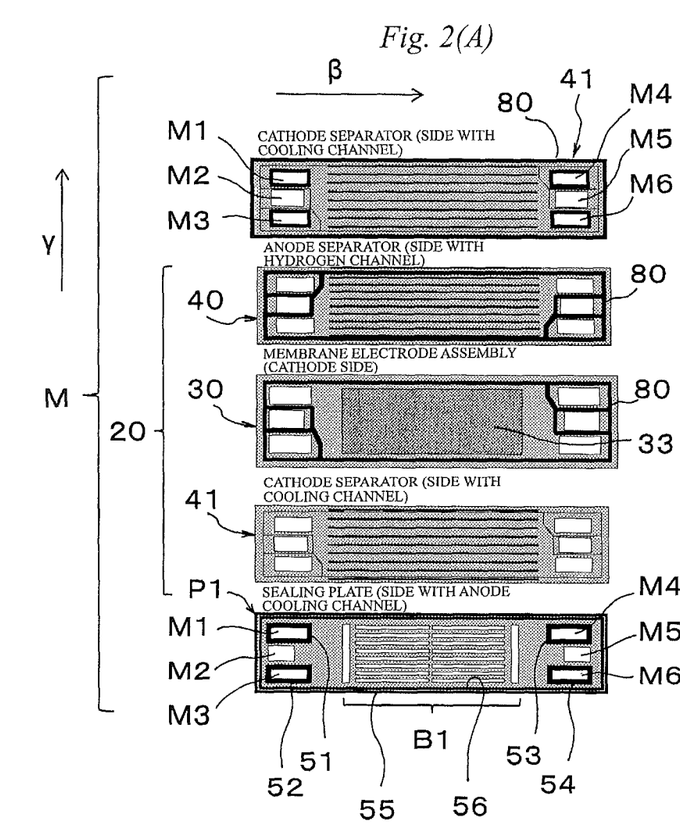
FIG. 2(A) is a plan view of one side of separators, a membrane electrode assembly and a sealing plate of a cell module.
Figure 2B:
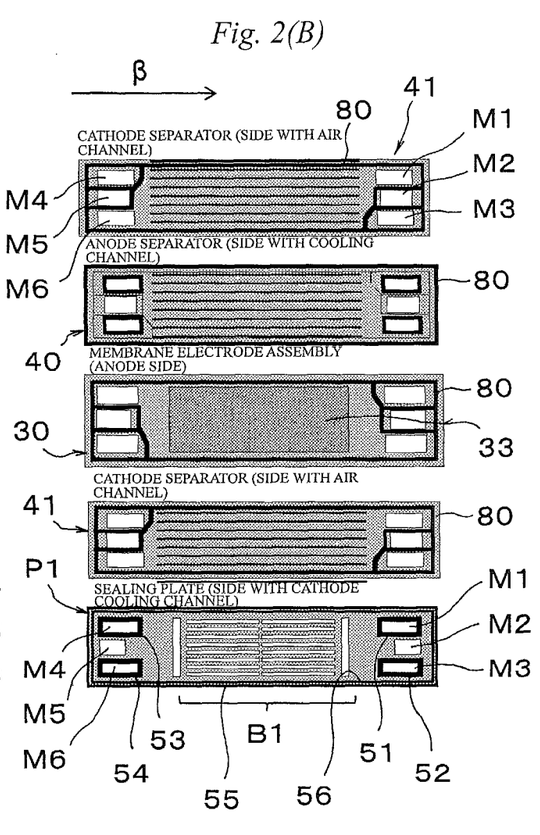
FIG. 2(B) is a plan view of the other side, illustrating the arrangement thereof.
Figure 3A:
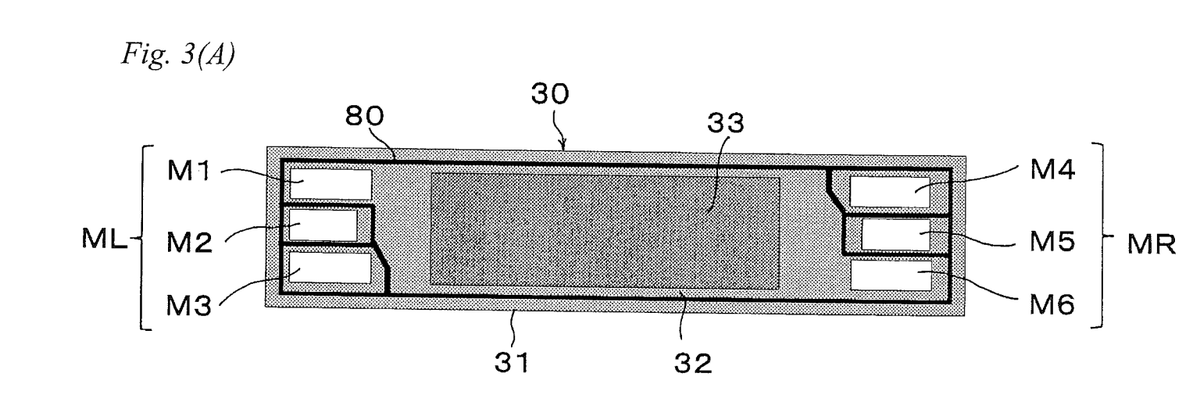
FIG. 3(A) is an enlarged plan view of the cathode separator.
Figure 3B:
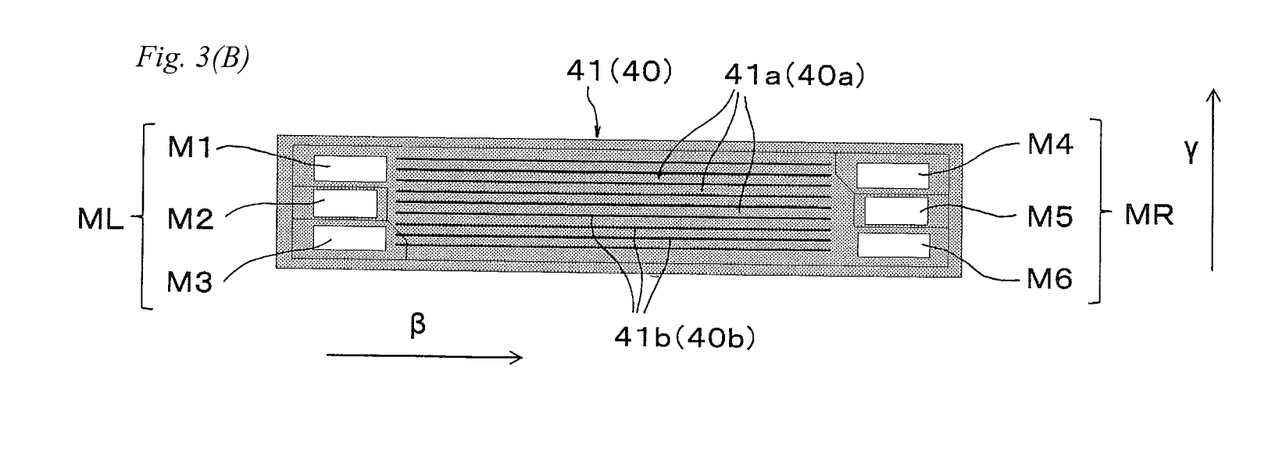
FIG. 3(B) is an enlarged plan view of the membrane electrode assembly of FIG. 2(A).
Figure 4:
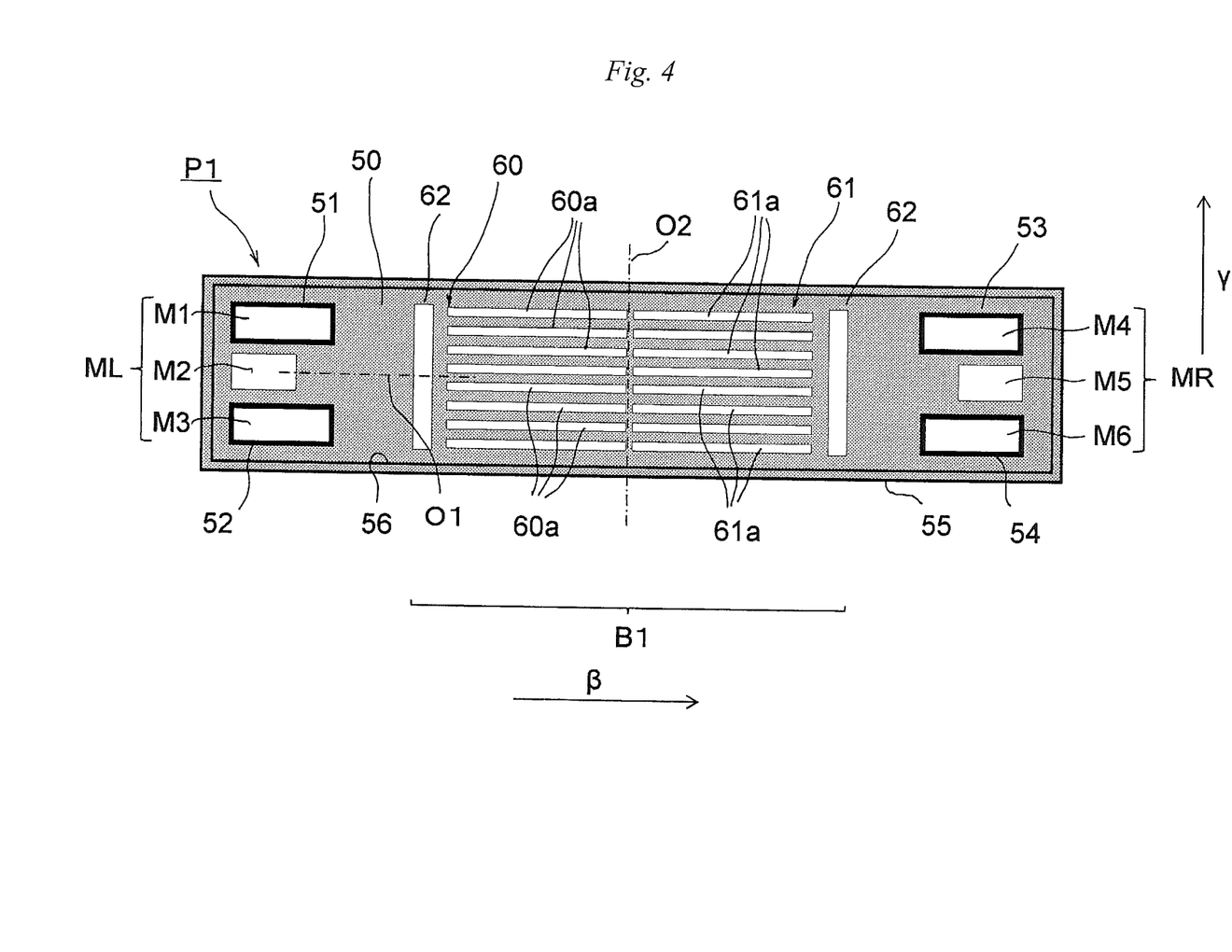
FIG. 4 is an enlarged plan view of the sealing plate of FIG. 2.
Figure 5:
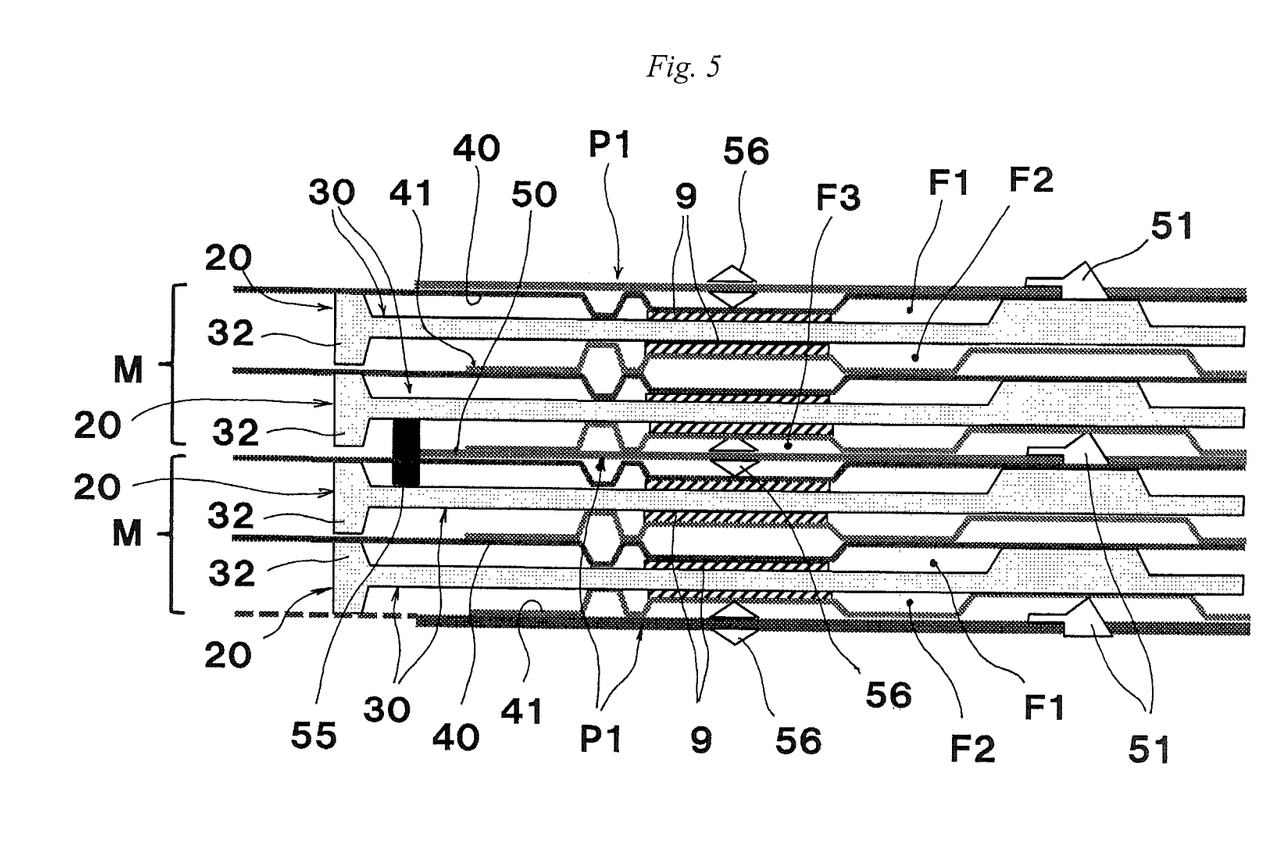
FIG. 5 is a cross sectional view of a cell module.

Hereinafter, a fuel cell stack according to one or more embodiments of the present invention will be described based on the drawings. FIG. 1 to FIG. 5 illustrate the configuration of the fuel cell stack. FIG. 1 is a schematic perspective outline view of the fuel cell stack according to one or more embodiments of the present invention. FIG. 2(A) is a plan view of one side of separators, a membrane electrode assembly and a sealing plate of a cell module and FIG. 2(B) is a plan view of the other side, which illustrate the arrangement thereof. FIG. 3(A) is an enlarged plan view of the cathode separator, and FIG. 3(B) is an enlarged plan view of the membrane electrode assembly of FIG. 2(A). FIG. 4 is an enlarged plan view of the sealing plate of FIGS. 2(A)-2(B), and FIG. 5 is a cross sectional view of the cell module.

In the fuel cell stack A of FIG. 1, a plurality of cell modules M are stacked, and a pair of end plates 10, 11 sandwich the stack. Further, sealing plates P to seal a reactant gas and/or cooling fluid are interposed between the cell modules M and between the outermost cell modules M, M and the end plates 10, 11.

Each of the cell modules M includes a stacked plurality of single cells 20. The outer wall thereof is defined by flanges 32 of cell frames 30 and adhesives 9, which are described below. This configuration prevents water from penetrating into the cell modules M and also provides electrical insulation. In FIG. 1, five single cells 20 are stacked and bonded to each other as an example. However, the number of single cells 20 is not limited thereto. Further, adhesive layers are not shown in the figure.

Each of the above-described single cells 20 includes a cell frame 30 as illustrated in FIGS. 2(A)-2(B) and FIG. 3(A) that is sandwiched between a pair of separators 40, 41 as illustrated in FIGS. 2(A)-2(B) and FIG. 3(B). The single cell 20 has gas flow channels F1, F2 for reactant gas formed between the cell frame 30 and the separators 40, 41. The reactant gas corresponds to oxygen-containing gas (cathode gas) or hydrogen-containing gas (anode gas).

The cell frame 30 is constituted by an insulating member, specifically is made of resin. In one or more embodiments, the cell frame 30 includes a base plate 31 that is formed in a horizontally long rectangular shape with a constant thickness in a front view from the stacking direction α of the single cells 20, and a flange 32 that protrudes from both sides of the base plate 31 along the whole periphery. At the center part of the cell frame 30, a membrane electrode assembly 33 is provided, and manifold portions ML, MR are arranged on both sides (both ends) of the membrane electrode assembly 33.

The membrane electrode assembly 33, which is also referred to as an MEA, includes, for example, an electrolyte membrane of a solid polymer sandwiched between a pair of electrodes.

The manifold portions ML, MR are configured to allow the hydrogen-containing gas, the oxygen-containing gas and the cooling fluid to flow in/out through them individually. Between the manifold portions ML, MR and the membrane electrode assembly 33, diffuser areas D, D for the hydrogen-containing gas and the oxygen-containing gas are formed. The cooling fluid is constituted by, for example, water.

The manifold portion ML on one side is composed of manifold holes M1 to M3. The manifold holes M1 to M3 are configured respectively to supply the oxygen-containing gas (M1), to supply the cooling fluid (M2) and to supply the hydrogen-containing gas (M3). They communicate in the stacking direction α to form respective channels.

The manifold portion MR on the other side is composed of manifold holes M4 to M6. The manifold holes M4 to M6 are configured respectively to discharge the hydrogen-containing gas (M4), to discharge the cooling fluid (M5) and to discharge the oxygen-containing gas (M6). They communicate in the stacking direction α to form respective channels. The positional relationship of the manifold holes may be partly or fully reversed in respect of supply and discharge.

The diffuser areas D are formed between the cell frame 30 and each of the separators 40, 41, i.e. on both sides of the cell frame 30, where a plurality of protrusions with a suitable shape are disposed at predetermined intervals (not shown in the figure).

FIG. 2(A) illustrates one side of the cathode and anode separators 40, 41, cell frame 30 and membrane electrode assembly 33 and a sealing plate P1, and FIG. 2(B) illustrates the other side of the components of FIG. 2(A) by flipping them over around a vertical axis in FIGS. 2(A)-2(B). The components illustrated in FIG. 2(A) are stacked sequentially such that the sealing plate P1 illustrated in the bottom is placed on the top. The components illustrated in FIG. 2(B) are stacked sequentially such that the cathode separator 41 illustrated on the top is placed on the top.

On the cell frame 30, an adhesive sealer 80 is continuously provided along the outer edge over the whole periphery and around the manifold holes M1 to M6 as illustrated in FIGS. 2(A)-2(B) and FIG. 3(A). In this regard, the adhesive sealer 80 on the cathode side of the cell frame 30 illustrated in FIG. 2(A) is open at the manifold holes M1, M6 for supplying and discharging the oxygen-containing gas in order to allow a flow of the oxygen-containing gas, while it encloses the other manifold holes M2 to M5.

Further, the adhesive sealer 80 on the anode side of the cell frame 30 illustrated in FIG. 2(B) is open at the manifold holes M3, M4 for supplying and discharging the hydrogen-containing gas in order to allow a flow of the hydrogen containing gas, while it encloses the other manifold holes M1, M2, M5, M6.

The separators 40, 41 are constituted by, for example, a press-molded metal plate of stainless steel or the like. As illustrated in FIGS. 2(A)-2(B) and FIG. 3(B), the separators 40, 41 are formed in a rectangular shape with a size that can be disposed in the area inside the flange 32 of the cell frame 30.

As particularly illustrated in FIG. 3(B) for the cathode separator 41, the separators 40 (41) include an uneven portions 41a (40a), 41b (40b) extending in the longitudinal direction in the center part opposed to the membrane electrode assembly 33, and further include manifold holes M1 to M6 formed at both ends, corresponding to the manifold holes M1 to M6 of the cell frame 30.

On the separators 40, 41, the adhesive sealer 80 is continuously provided along the outer edge over the whole periphery and around the manifold holes M1 to M6 as with the cell frame 30. In this regard, the adhesive sealer 80 is open at the corresponding holes among the manifold holes M1 to M6 in order to allow a flow of the hydrogen-containing gas, the oxygen-containing gas and the cooling fluid in the respective interlayers, while it encloses the other holes among the manifold holes M1 to M6, as illustrated in FIGS. 2(A) and 2(B).

In the cell modules M of the fuel cell stack A, opposing separators 40, 41 of adjacent single cells 20, 20 define a channel F3 for the cooling fluid (hereinafter referred to as a "cooling channel") therebetween. Further, a space between adjacent two cell modules M, M, specifically a space enclosed and defined by the flanges 32 of the outermost single cells 20, 20 oppositely abutting each other, also serves as the cooling channel F3. The fuel cell stack A includes sealing plates P1 interposed in the cooling channels F3 between the cell modules M, M.

Each of the sealing plates P1 is formed as a separate piece from the single cells 20. As illustrated in FIGS. 2(A)-2(B) and FIG. 4, the sealing plate P1 includes openings of manifold portions ML, MR at both ends of a plate base 50, and a pressure loss regulating portion B1 at the center part.

The plate base 50 is constituted by a molded electrically-conductive single metal plate. The plate base 50 is formed in substantially the same shape and size as the above-described single cells 20 in the plan view. Since the plate base 50 is constituted by an electrically-conductive metal plate, it can provide stable electrical connection over time. The manifold portions ML, MR formed in the plate base 50 are identical to those formed in the cell frame 30 and the like.

The sealing plate P1 includes manifold holes M1 to M6 corresponding to the manifold holes M1 to M6 of the cell modules M. When the sealing plate P1 is interposed between the cell modules M, M, the manifold holes M1 to M6 are communicated to form respective channels.

The sealing plate P1 includes sealing members 51 to 54 along the edges of the plate base 50 that define the manifold holes M1, M3, M4, M6 used for a flow of the oxygen-containing gas and the hydrogen containing gas. The sealing members 51 to 54 provided along the edges of the manifold holes M1, M3, M4, M6 are independently formed from each other. Needless to say, the manifold holes M2, M4 used for a flow of the cooling fluid have no sealing member, and are therefore open.

As illustrated in FIG. 5, the sealing plate P1 includes an outer sealing member 55 disposed along the outermost edge part of the plate base 50. It further includes an inner sealing member 56 disposed inside the outer sealing member 55 in parallel to the outer sealing member 55 at a predetermined distance. The sealing plate P1 prevents a leak of the cooling fluid flowing in the cooling channel F3 by means of the inner sealing member 56, and keeps back rainwater from the outside and also provides electrical insulation by means of the outer sealing member 55. In FIG. 5, reference sign 9 indicates an adhesive.

In the sealing plate P1, the independent structure of the sealing members 51 to 54 around the manifold holes M1, M3, M4 and M6 enables individually setting the design (height, width, shape) of the sealing members 51 to 54. The sealing members are exposed to different fluids depending on the location, and are therefore subject to different environments of deterioration. However, the sealing members 51 to 54 can be individually designed in accordance with the environment, and the reliability of the fuel cell stack can therefore be improved.

As illustrated in FIG. 4, the pressure loss regulating portion B1 has a function of reducing and regulating a pressure loss of the cooling fluid flowing through the cooling channel. The reduction and regulation of a pressure loss can be achieved by decreasing the cross section of the cooling channel within an area opposed to an active area or an area near the active area or within both areas. Such reduction of the cross section of the cooling channel includes reduction both in the flowing direction β of the cooling fluid and in the direction γ perpendicular to the flowing direction β The term "active area" refers to an area opposed to the membrane electrode assembly 33.

The pressure loss regulating portion B1 illustrated in the figure includes an upstream slit array 60 and a downstream slit array 61 formed in parallel to the longitudinal axis center line O1 of the plate base 50, and two slits 62, 62 formed in parallel to the transverse axis center line O2 perpendicular to the longitudinal axis center line O1. The longitudinal axis center line O1 is a virtual line that equally divides the short sides of the plate base 50, and the transverse center axis line O2 is a virtual line that equally divides the long sides of the plate base 50.

The upstream slit array 60 is composed of eight slits 60a arranged in the upstream in the flowing direction β of the cooling fluid. The slits 60a are arranged in parallel to the flowing direction β and are formed in the same length and width. The downstream slit array 61 is composed of eight slits 61a arranged in the upstream in the flowing direction β of the cooling fluid. As with the slits 60a, the slits 61a are arranged in parallel to the flowing direction β and are formed in the same length and width.

As illustrated in FIG. 5, the fuel cell stack A with the above-described configuration includes voltage measuring terminals 40T protruding to the outside of cells (to the left in FIG. 5) provided in the cathode separators 40 of each single cells 20. The voltage of each single cell 20 is measured by using its own voltage measuring terminal 40T and the voltage measuring terminal 40T of the adjacent single cell 20.

In the cell module M located in the middle of the stack, the voltage of the outermost single cell 20 can be measured by using its own voltage measuring terminal 40T and the voltage measuring terminal 40T of the outermost single cell 20 of the adjacent cell module M.

However, in the outermost cell module M located at the bottom in FIG. 5, the voltage of the outermost (lowermost) single cell 20 cannot be measured without any modification because there is no cell module M therebelow. Assuming that the voltage measuring terminal PT of the sealing plate P1 is not provided, the terminal PT is illustrated by the dotted line in FIG. 5.

Thus, in the fuel cell stack A according to one or more embodiments of the present invention, the voltage measuring terminal PT (illustrated by the dotted line) protruding to the outside of a cell is provided in at least one of the sealing plates P1.

Figure 6A:
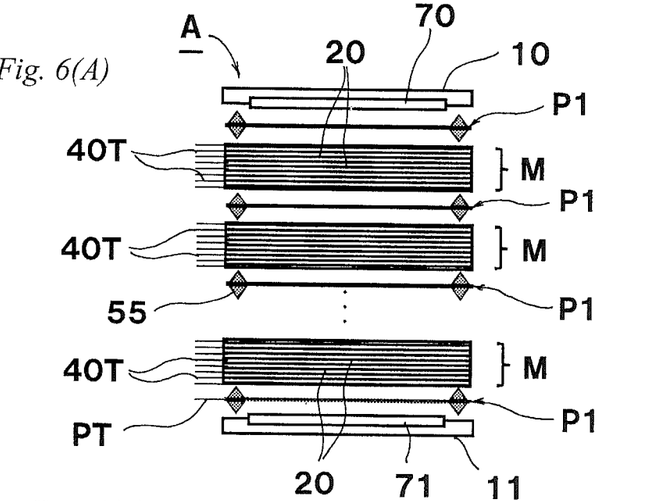
FIG. 6(A) is a schematic cross sectional view of a fuel cell stack according to one or more embodiments of the present invention.

As illustrated in FIG. 6(A), the fuel cell stack A includes the stacked plurality of cell modules M, each including the stacked plurality of single cells 20, and the pair of end plates 10, 11 that sandwich the cell modules M in the stacking direction. Between the cell modules M and the end plates 10, 11, current collector plates 70, 71 are interposed respectively.

The fuel cell stack A further includes the sealing plates P1 to seal the reactant gas and/or the cooling fluid, disposed between the cell modules M and between the outermost (uppermost and lowermost) cell modules M and the end plates 10, 11. As described above, each of the single cells 20 includes the voltage measuring terminal 40T formed in its cathode separator 40.

Figure 6B:
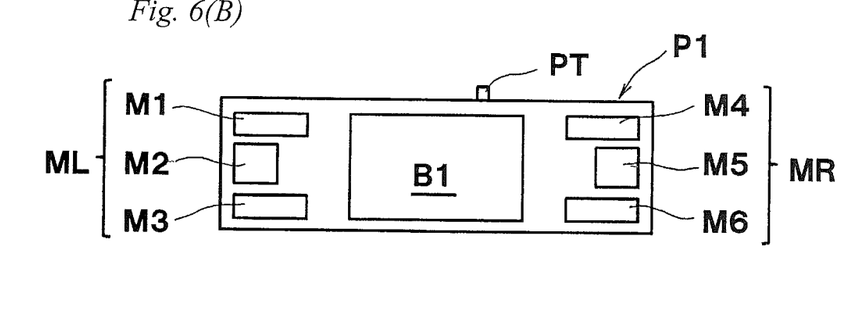
FIG. 6(B) is a plan view of a sealing plate.

Furthermore, the fuel cell stack A includes the voltage measuring terminal PT protruding to the outside of cells, in at least one of the sealing plates P. In one or more embodiments, the voltage measuring terminal PT is provided in the sealing plate P1 adjacent to the lower end plate 11 in the figure. In FIG. 6(B), the voltage measuring terminal PT is disposed on a long side of the sealing plate P1. However, the location and shape thereof is not particularly limited.

In the fuel cell stack A with the above-described configuration, the voltage of each single cell 20 is measured by using the voltage measuring terminals 40T of the separators 40 of adjacent single cells 20. For the outermost single cell 20 of the outermost cell module M, i.e. the lowermost single cell 20 in FIG. 5 and FIGS. 6(A)-6(B), the voltage is measured by using its own voltage measuring terminal 40T and the voltage measuring terminal PT of the sealing plate P1.

As described above, while the fuel cell stack A has features of being sealed and detachable due to the sealing plates P1, the voltage can be measured for all of the single cells 20 or a selected single cell 20. Since the fuel cell stack A can seal the reactant gas by utilizing the sealing structure of the cell modules M, the voltage at a required portion can be measured without any additional particular sealing structure although the voltage measuring terminal 40T is provided. Furthermore, this also results in a simple structure, which contributes to cost reduction and the like.

FIG. 7(A) to FIG. 9 illustrate fuel cell stacks according to one or more embodiments of the present invention. The same reference signs are denoted to the same components as above, and the detailed description thereof is omitted.

Figure 7A:
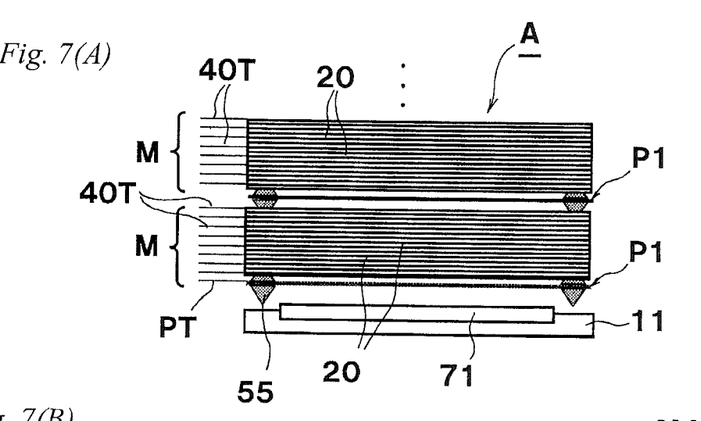
FIG. 7(A) is a schematic cross sectional view of a fuel cell stack according to one or more embodiments of the present invention.

As with above, a fuel cell stack A of FIG. 7(A) includes voltage measuring terminals 40T protruding to the outside of cells, in separators with the same polarity, i.e. cathode separators 40, of each single cell 20. Further, a voltage measuring terminal P1 is provided in a sealing plate P1 adjacent to the lower end plate 11 in the figure.

Figure 7B:
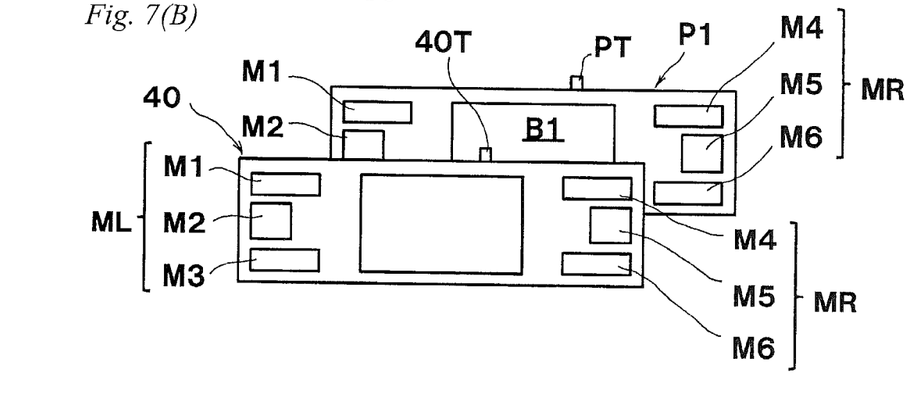
FIG. 7(B) is a plan view of a sealing plate and a separator.

As illustrated in FIG. 7(B), in the fuel cell stack A, the voltage measuring terminal PT of the sealing plate P1 corresponds to the voltage measuring terminals 40T (of the separators 40) of the single cells 20 in terms of location, shape, size and thickness. Furthermore, the interval between any adjacent voltage measuring terminals 40T, PT is identical.

That is, since the voltage measuring terminals 40T of the single cells 20 are arranged at regular intervals, the intervals between the voltage measuring terminal PT of the sealing plate P1 and the voltage measuring terminal 40T of the adjacent single cell 20 only have to be adjusted to that regular intervals.

As with above, while the fuel cell stack A with the above-described configuration has features of being sealed and detachable due to the sealing plates P1, utilizing the sealing structure of the cell modules M enables measuring the voltage at a required portion at low cost without any additional particular sealing structure.

In the fuel cell stack A, the voltage measuring terminals 40T protruding to the outside of cells are provided in the separators 40 with the same polarity of each single cell 20, the voltage measuring terminal PT of the sealing plate P1 correspond to the voltage measuring terminals 40T of the separators 40 in terms of the location, shape, size and thickness, and the interval between any adjacent voltage measuring terminals 40T, PT is identical. Therefore, a common connector can be used for all of the voltage measuring terminals 40T, PT, which can further reduce the number of parts and cost.

For example, the connector is connected to the individual cell modules M and may be configured to contact with all of the voltage measuring terminals 40T, PT or only with a selected voltage terminal 40T, PT of a connected cell module M. Further, the fuel cell stack A may have a case-integrated structure covered with a plurality of outer panels or a housing. In this case, the voltage measuring terminals 40T, PT are exposed to the outside of the case, so that the connector is connected thereto.

Figure 8A:
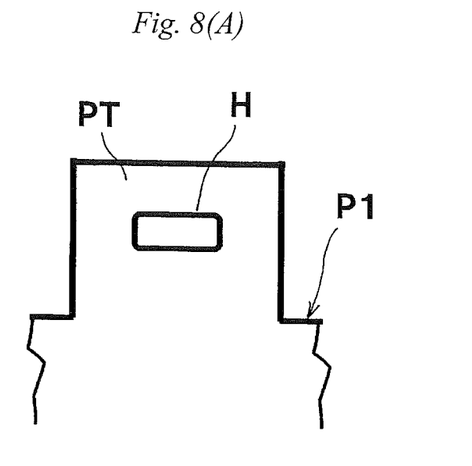
Figure 8B:
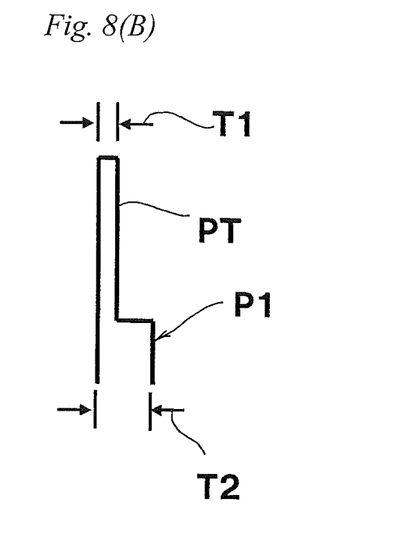
FIG. 8(B) is a cross sectional view, of a voltage measuring terminal of a sealing plate.

FIGS. 8(A)-8(B) illustrate a voltage measuring terminal PT of a sealing plate P1 according to one or more embodiments. The thickness T1 of the voltage measuring terminal PT of the figure is less than the thickness T2 of the sealing plate body. Further, the voltage measuring terminal PT of the figure has an opening H in the center part. The thickness T1 of the voltage measuring terminal PT is equal to the thickness of voltage measuring terminals 40T (of separators 40) of single cells 20 as with the embodiment of FIGS. 7(A)-7(B).

In the sealing plate P1 with the above-described configuration, the thickness T1 of the voltage measuring terminal PT is less than the thickness T2 of the sealing plate body. Therefore, it can provide the voltage measurable function, while maintaining its own strength at a sufficient level. This configuration also facilitates adjusting the thickness of the voltage measuring terminal PT to the thickness of the voltage measuring terminals 40T of the single cells 20. Further, the opening H improves the interlocking force with the connector (not shown). As a result, the voltage measuring terminal PT of the sealing plate P1 can be identical to those of the single cells 20, which can reduce variability in contact resistance.

Figure 9:
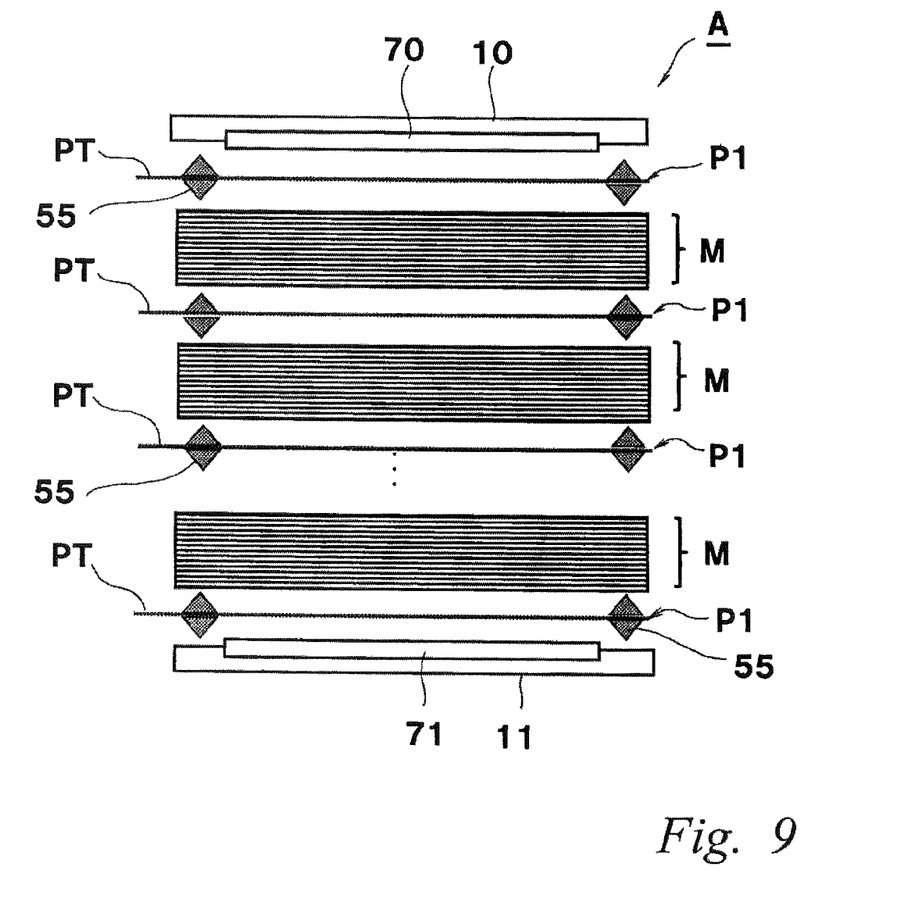
FIG. 9 is a schematic cross sectional view of a fuel cell stack according to one or more embodiments of the present invention.

In a fuel cell stack A of FIG. 9, voltage measuring terminals PT are provided in all sealing plates P1. In the illustrated embodiment, the fuel cell stack A does not include voltage measuring terminals (of separators 40) of single cells 20, but includes the voltage measuring terminals PT formed in each sealing plate P1 approximately at the same location with the same size, shape and thickness. However, the voltage measuring terminals PT do not necessarily have the same configuration.

As with one or more of the previous embodiments, while the fuel cell stack A with the above-described configuration has features of being sealed and detachable due to the sealing plates P1, utilizing the sealing structure of the cell modules M enables measuring the voltage at a required portion at low cost without any additional particular sealing structure. Furthermore, in the fuel cell stack A, the voltage measuring terminal PT are provided in all of the sealing plates P1. This enables measuring the voltage for each cell module M. This can also reduce the number of connectors, so as to reduce the number of parts and man-hour required for the assembly process, which enables further cost reduction.

The configuration of the fuel cell stack of the present invention is not limited to those of the above-described embodiments, and detail of the configuration may be suitably changed and the configurations of the embodiments can be combined with each other without departing from the scope of the present invention. The arrangement and shape of the pressure loss regulating portion of the sealing plates is not limited to those of the above-described embodiments, and detail of the configuration may be suitably changed. The arrangement and shape of the pressure loss regulating portion is not limited to those of the above-described embodiments, and detail of the configuration may be suitably changed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

A Fuel cell stack
M Cell module
P1 Sealing plate
PT Voltage measuring terminal
10 End plate
11 End plate
20 Single cell
33 Membrane electrode assembly
40 Cathode separator
40T Voltage measuring terminal
41 Anode separator

The invention claimed is:

1. A fuel cell stack, comprising:
   a stacked plurality of cell modules, each of the plurality of cell modules comprising a stacked plurality of single cells, each of the plurality of single cells comprising a membrane electrode assembly sandwiched between a pair of separators;
   a pair of end plates that sandwich the plurality of cell modules in the stacking direction;
   sealing plates to seal a reactant gas, disposed between the plurality of cell modules and between outermost cell modules and the end plates; and
   a voltage measuring terminal protruding to an outside of the cells, provided in at least one of the sealing plates.

2. The fuel cell stack according to claim 1, wherein the voltage measuring terminal is provided in at least a sealing plate adjacent to one of the end plates.

3. The fuel cell stack according to claim 2,
   wherein voltage measuring terminals protruding to the outside of the cells are provided in the separator with a same polarity of each of the plurality of single cells,
   the voltage measuring terminal of the sealing plates corresponds to the voltage measuring terminal of the separator in terms of position, shape, size and thickness, and
   an interval between adjacent voltage measuring terminals is identical.

4. The fuel cell stack according to claim 3, wherein a thickness of the voltage measuring terminal of the sealing plates is less than a thickness of a body of the sealing plates.

5. The fuel cell stack according to claim 1,
wherein voltage measuring terminals protruding to the outside of the cells are provided in the separator with a same polarity of each of the plurality of single cells,
the voltage measuring terminal of the sealing plates corresponds to the voltage measuring terminal of the separator in terms of position, shape, size and thickness, and
an interval between adjacent voltage measuring terminals is identical.

6. The fuel cell stack according to claim 5, wherein a thickness of the voltage measuring terminal of the sealing plates is less than a thickness of a body of the sealing plates.

7. The fuel cell stack according to claim 1, wherein the voltage measuring terminal is provided in all of the sealing plates.

* * * * *